United States Patent
Lee

(10) Patent No.: US 7,313,395 B2
(45) Date of Patent: Dec. 25, 2007

(54) ADAPTIVE DATA RATE CONTROL METHOD

(75) Inventor: Young Jo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 10/815,834

(22) Filed: Apr. 2, 2004

(65) Prior Publication Data

US 2004/0202146 A1   Oct. 14, 2004

(30) Foreign Application Priority Data

Apr. 8, 2003   (KR) .................. 10-2003-0021950

(51) Int. Cl.
  *H04Q 7/20* (2006.01)
  *H04B 7/00* (2006.01)
(52) U.S. Cl. .............. 455/434; 455/68; 455/435.1; 370/347
(58) Field of Classification Search ............ 455/434, 455/68–70, 435.1, 435.3; 370/347, 442, 370/458, 328–329, 331–332, 335–337, 342
  See application file for complete search history.

(56) References Cited

U.S. PATENT DOCUMENTS

| 6,504,838 | B1 * | 1/2003 | Kwan .................... 370/352 |
| 6,996,373 | B2 * | 2/2006 | Kurhila et al. .......... 455/67.11 |
| 7,099,629 | B1 * | 8/2006 | Bender ................... 455/69 |
| 2003/0083090 | A1 * | 5/2003 | Huh et al. ............ 455/522 |

* cited by examiner

*Primary Examiner*—Tony T. Nguyen
(74) *Attorney, Agent, or Firm*—Ked & Associates, LLP

(57) ABSTRACT

A wireless communication terminal adaptively controls a forward data rate based on a channel status and with regard to a delay time existing between the detecting of the channel status and transmitting the data. An adaptive data rate control (DRC) method includes steps of receiving a pilot signal from a base station; detecting a channel status by measuring a power level of the received pilot signal; calculating a delay time, the delay time equaling a time interval indicative a pilot signal and reception of a data signal; determining a target forward data rate based on an offset value corresponding to the delay time; and transmitting a value indicative of the target forward data rate to the base station. The forward data rate is requested in consideration of the delay time.

14 Claims, 3 Drawing Sheets

ADAPTIVE DATA RATE CONTROL METHOD

This application claims the benefit of Korean Application No. 10-2003 0021950 filed on Apr. 8, 2003, which is hereby incorporated by reference.

BACKGROUND OF THE INVENTION

1. Field of the Invention

The present invention relates to a wireless communication system, and more particularly, to a method for adaptively controlling a data transmission rate according to a channel status, i.e., a signal-to-interference ratio, in which a delay time is used in determining a forward data rate to be requested.

2. Discussion of the Related Art

A wireless communication terminal is a portable terminal for wireless communication, such as a PCS, a PDA, a smart phone, or a wireless LAN terminal. In a wireless communication system such as the IMT-2000 standard, which enables high-speed data transmission, channel status fluctuates rapidly over time as a result of channel fading and other factors. Therefore, the current channel status is an important factor in determining the data rate in a wireless communication system and is particularly problematic in asymmetrical data links such as the downloading of a data stream on a forward traffic channel.

In the downlink of a wireless communication system, a base station uses a forward channel to transmit a pilot signal, which is received by a wireless communication terminal. The power level of the received pilot signal is measured to determine a current channel status, so that a forward data rate appropriate for the current channel status can be determined. Here, the channel status is based on a measurement of a signal-to-interference ratio (SIR), and a lookup table is used to determine a forward data rate for request based on the obtained SIR value.

The requested forward traffic channel data rate is mapped into a four-bit data rate control (DRC) value as specified by the forward traffic channel MAC protocol. The wireless communication terminal uses a DRC channel to transmit the DRC value to the base station, which thereafter transmits data on the forward traffic channel in accordance with the requested forward data rate. In doing so, DRC symbols occupy at least one slot of the DRC channel corresponding to a DRC length beginning with the first slot of the DRC channel following the pilot signal transmission on the forward traffic channel. Subsequently, data transmission on the forward traffic channel is performed at the requested data rate, beginning from the next slot following the transmission of the DRC symbols. Therefore, conventionally, there is a delay time between pilot signal transmission and data transmission, which corresponds to the DRC length plus one slot.

Meanwhile, the channel status dynamic may produce a change in the channel status, occurring during the above-mentioned delay time, such that data transmission from the base station cannot reflect the most current channel status at the wireless communication terminal. In particular, if the channel status becomes degraded during the delay time, the requested forward data rate, which was determined based on the channel status at the time of pilot signal reception, may be too high. Accordingly, there is a need for an adaptive DRC method in which this potential change in channel status is considered.

SUMMARY OF THE INVENTION

Accordingly, the present invention is directed to a method of adaptively controlling a forward data rate of a wireless communication system, which substantially obviates one or more of the problems due to limitations and disadvantages of the related art.

An object of the present invention, which has been devised to solve the foregoing problem, lies in providing an adaptive DRC method by which data transmission is adaptively performed at a reduced data rate in accordance with a delay time, occurring with respect to the forward traffic channel, between the reception of a pilot signal at a wireless communication terminal and its subsequent reception of data transmitted by a base station.

It is another object of the present invention to provide an adaptive DRC method, in which an optimal forward data rate is selected for request by a wireless communication terminal.

It is another object of the present invention to provide an adaptive DRC method, in which a requested forward data rate is determined based on a channel status and with regard to a delay time existing between detecting the channel status and transmitting the data.

It is another object of the present invention to provide an adaptive DRC method, in which a packet error rate in a wireless communication terminal is consistently reduced.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of adaptively controlling a forward data rate with regard to a delay time calculated by a wireless communication terminal. The method comprises steps of receiving a pilot signal from a base station; detecting a channel status by measuring a power level of the received pilot signal; calculating a delay time, the delay time equaling a time interval indicative of a pilot signal and reception of a data signal; determining a target forward data rate based on an offset value corresponding to the delay time; and transmitting a value indicative of the target forward data rate to the base station.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

Figure 1A:
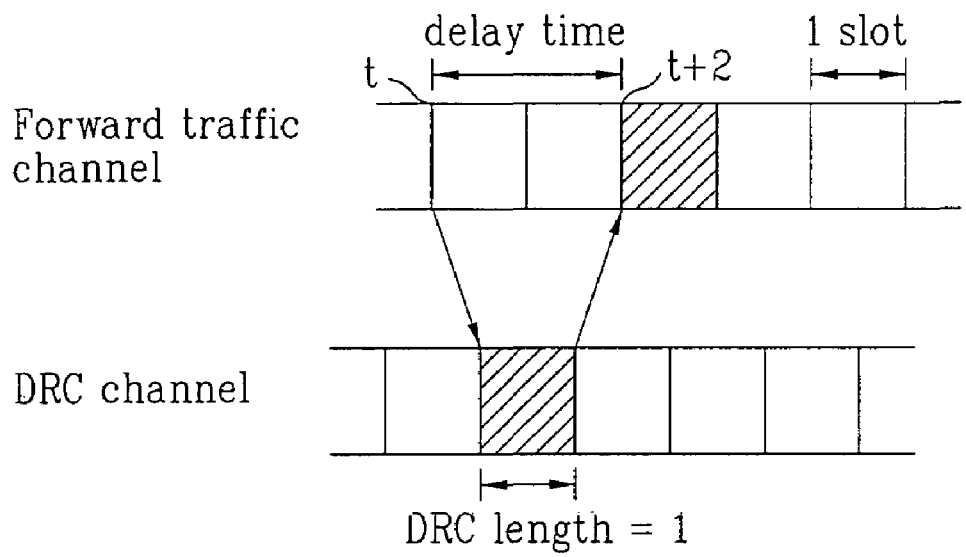
FIGS. 1A and 1B are DRC timing diagrams for nongated-transmission in a wireless communication system, showing delay times for varying DRC lengths.
Figure 1B:
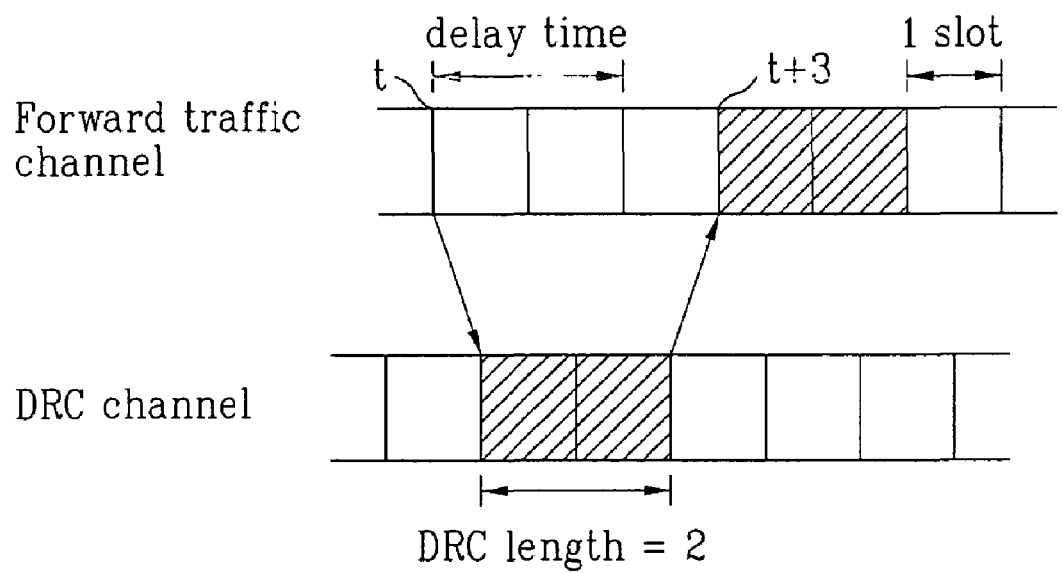
Figure 2A:
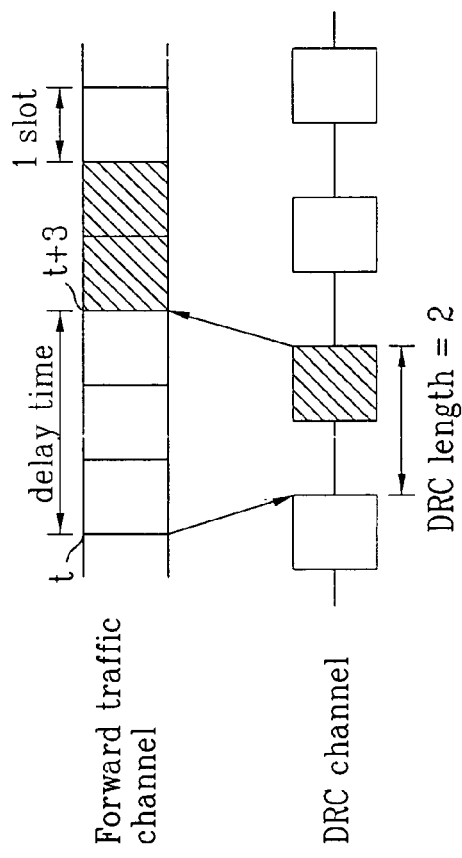
FIGS. 2A and 2B are DRC timing diagrams for gated-transmission in a wireless communication system, showing delay times for varying DRC lengths.
Figure 2B:
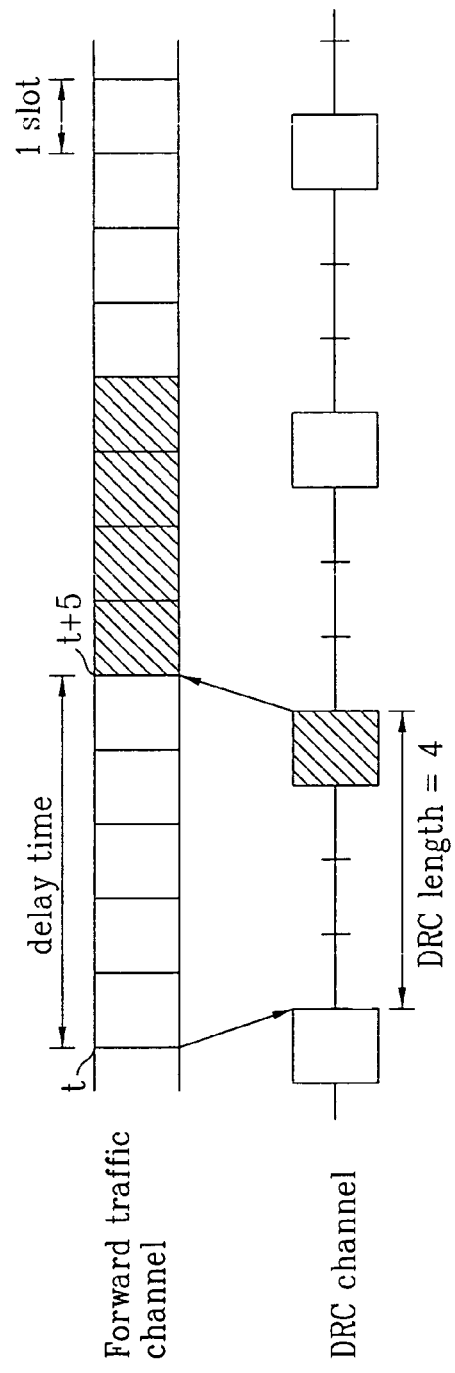

The timing diagrams of FIGS. 1A and 1B and FIGS. 2A and 2B depict a relative timing for a forward traffic channel and a data rate control (DRC) channel, to demonstrate the presence of a delay time in the forward traffic channel. FIGS. 1A and 1B each include a DRC channel in a continuous transmission state, i.e., without gating; FIGS. 2A and 2B each include a DRC channel in a discontinuous transmission state, i.e., with gating. In a wireless communication system through which a base station transmits accessed data on the forward traffic channel, a wireless communication terminal transmits DRC symbols on the DRC channel during a time period corresponding to a DRC length in units of one, two, four, or eight slots, following pilot signal transmission and starting from a mid-slot point with respect to the forward traffic channel. Thus, a DRC value indicating a forward data rate to be requested is determined by the wireless communication terminal (an access terminal) and is periodically transmitted to one or more base stations setting the forward data rate of the wireless communication system (an access network). The wireless communication terminal sets the DRC value to the maximum value that channel conditions permit.

The DRC channel of FIG. 1A exhibits a DRC length of one slot while that of FIG. 1B exhibits a DRC length of two slots, and the DRC channel of FIG. 2A exhibits a DRC length of two slots while that of FIG. 2B exhibits a DRC length of four slots. In other words, the DRC lengths of FIGS. 1B and 2B are greater than those of FIGS. 1A and 2A, respectively. In each instance, the base station transmits the pilot signal to the wireless communication terminal at a time t, which determines the current channel status based on the power level of the received pilot signal. Thereafter, a delay time is determined based on the DRC length of the DRC channel, and an appropriate DRC value is determined and transmitted. The wireless communication terminal periodically transmits the DRC value, so that the base station may begin data transmission at a time t+(DRCLength+1). Here, hashed slots indicate transmission of the DRC value on the DRC channel and the data on the forward traffic channel.

Figure 3:
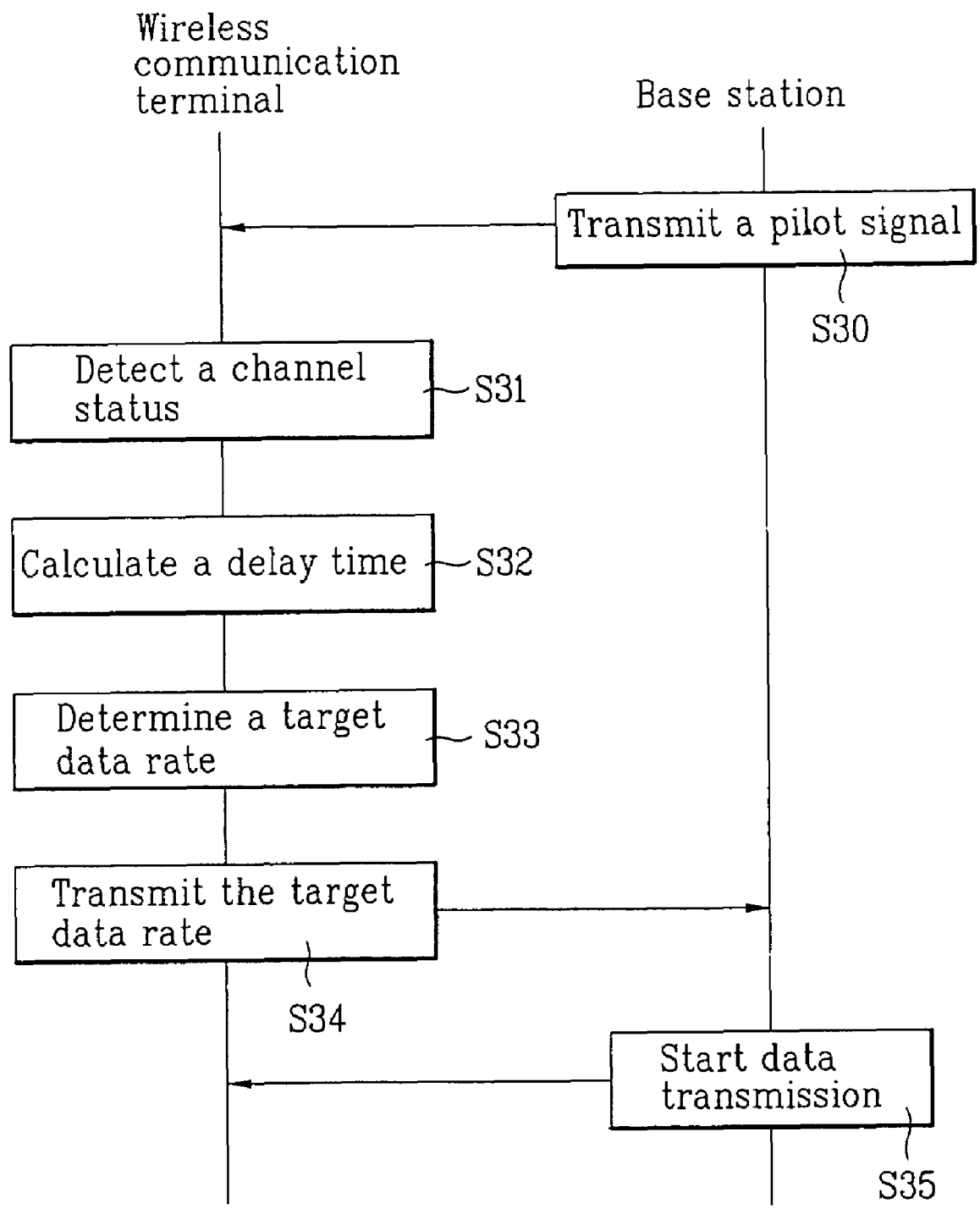
FIG. 3 is an operational flow diagram of an adaptive DRC method according to the present invention.

FIG. 3 illustrates the adaptive DRC method of present invention, in which a target forward data rate is requested based on a delay time in accordance with the present invention. Here, the wireless communication terminal is accessing data from one base station of a wireless communication system.

In a step S30, a pilot signal is transmitted from the base station and received by the wireless communication terminal, which determines in a step S31 a current channel status accordingly. Channel status may be determined by a measurement of the power level of the received pilot signal and represented as a signal-to-interference ratio (SIR). Accordingly, the determined channel status reflects conditions present at the time of pilot signal transmission.

With the current channel status thus determined, the wireless communication terminal calculates in a step S32 the delay time based on the DRC length and determines in a step S33 a forward data rate to be requested, i.e., a target forward data rate, based on the calculated delay time for a given channel status. Here, it should be noted that longer delay times may produce greater changes in the channel status, such that the optimal forward data rate may be a lower rate than that suggested by the current channel status. In other words, a lower data rate is prudent since the resulting packet error rate (PER) may increase with longer delay times.

In a step 34, when the requested forward data rate is determined as above, the corresponding DRC value is transmitted to the base station on the DRC channel. Thereafter, the base station starts transmitting the data to the wireless communication terminal at the requested forward data rate.

A wireless communication terminal adopting the method of the present invention requests the forward data rate based on the calculated delay time for a given channel status, using a lookup table stored in an internal memory device. In doing so, a set of offset values corresponding to delay times is referenced so that the optimal forward data rate may be selected in accordance with the Equation:

$$SIRm = SIRr - Offset$$

where SIRr is the received channel status information and where SIRm is adjusted channel status information reflecting the delay time, i.e., the offset value (in dB) corresponding to the delay time (DRCLength+1). Here, the SIRr value corresponds to the SIR value conventionally used to select a requested forward data rate. According to the present invention, however, the adjusted value (SIRm) is used in consideration of the delay time.

The following Table illustrates an example of a portion of the mapping of the channel status information, i.e., an SIR value, to a forward data rate appropriate for a given channel status. The optimum forward data rate to be requested, however, is determined by considering the offset value of the above Equation, which corresponds to the delay time of the present invention.

| SIR | forward data rate |
|---|---|
| 14 dB | 960 Kbps |
| 13 dB | |
| 12 dB | |
| 11 dB | |
| 10 dB | 480 Kbps |
| 9 dB | |
| 8 dB | |
| 7 dB | |
| 6 dB | 240 Kbps |
| 5 dB | |
| 4 dB | |
| 3 dB | |

As described above, the SIR value is obtained in accordance with a current channel status as determined by the measured power level of the pilot signal, and a forward data rate is mapped accordingly. For example, assuming an SIR value of about 11 dB, the wireless communication terminal would determine a forward data rate of 960 Kbps, which would be based on the current channel status, i.e., the SIRr value. Thereafter, by calculating the delay time in order to factor in the offset, an SIRm value can be reached. For example, assuming a delay time resulting in a 1 dB offset, the SIRm value becomes about 10 dB. Accordingly, the wireless communication terminal should request a forward data rate of 480 Kbps, which is the target forward data rate.

Therefore, according to the present invention, when data is transmitted on a forward traffic channel at a given rate, a predetermined offset value corresponding to a delay time is factored into a selection of an optimal forward data rate based on channel status. Thus, data transmission is adaptively performed at a reduced data rate in accordance with a delay time, occurring with respect to the forward traffic channel, between the reception of a pilot signal at a wireless communication terminal and its subsequent reception of data transmitted by a base station.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A method of adaptively controlling a forward data rate in a wireless communication system, the method comprising steps of:
    detecting a channel status according to a pilot signal received from a base station;
    calculating a delay time, the delay time equaling a time interval between reception of a pilot signal and reception of a data signal;
    determining a target forward data rate based on the calculated delay time and the channel status; and
    transmitting the determined target forward data rate to the base station.

2. The method of claim 1, wherein the delay time is calculated using SIRm=SIRr−Offset, wherein SIRm denotes adjusted channel status information based of the delay time, SIRr donotes received channel status information, and Offset denotes a value corresponding to the delay time.

3. The method of claim 1, wherein the data is transmitted at a time t+(DRCLength+1).

4. The method of claim 1, wherein the channel status is determined by measuring at least one of a power level of the received pilot signal and a signal-to-interference ratio (SIR).

5. The method of claim 1, wherein the target forward data rate is transmitted via a data rate control channel.

6. A method of adaptively controlling a forward data rate in a wireless communication system, the method comprising steps of:
    receiving a pilot signal from a base station;
    detecting a channel status by measuring a power level of the received pilot signal;
    calculating a delay time, the delay time equaling a time indicative of a pilot signal and reception of a data signal;
    determining a target forward data rate based on an offset value corresponding to the delay time; and
    transmitting of the determined target forward data rate to the base station.

7. A method as claimed in claim 6, wherein the offset value is one of a plurality of predetermined values corresponding to a plurality of delay times.

8. A method as claimed in claim 6, wherein the offset value is stored in an index.

9. The method of claim 6, wherein the delay time is calculated using SIRm=SIRr−Offset, wherein SIRm denotes adjusted channel status information based on the delay time, SIRr donotes received channel status information, and Offset denotes a value corresponding to the delay time.

10. The method of claim 6, wherein the data is transmitted at a time t+(DRCLength+1).

11. A method of adaptively determining a requested forward data rate in a wireless communication system, the method comprising steps of:
    receiving a pilot signal from a base station;
    detecting a channel status by measuring a power level of the received pilot signal;
    calculating a delay time according to a data rate control length;
    determining a target forward data rate based on channel status and the calculated delay time; and
    transmitting the determined target forward data rate to the base station.

12. A method as claimed in claim 11, wherein the target forward data rate is transmitted via a data rate control channel.

13. The method of claim 11, wherein the delay time is calculated using SIRm=SIRr−Offset, wherein SIRm denotes adjusted channel status information based on the delay time, SIRr donotes received channel status information, and Offset denotes a value corresponding to the delay time.

14. The method of claim 11, wherein the data is transmitted at a time t+(DRCLength+1).

* * * * *